United States Patent [19]

Maack et al.

[11] Patent Number: 4,559,702

[45] Date of Patent: Dec. 24, 1985

[54] HARNESS MAKING MACHINE HAVING IMPROVED WIRE JIG

[75] Inventors: Werner Maack, Seeheim; Michael Gerst, Worms; Manfred Liedloff, Dieburg, all of Fed. Rep. of Germany

[73] Assignee: AMP Incorporated, Harrisburg, Pa.

[21] Appl. No.: 551,621

[22] Filed: Nov. 14, 1983

[51] Int. Cl.[4] .......... B23P 19/00

[52] U.S. Cl. .......... 29/759; 29/749; 29/857; 198/477.1; 269/43; 269/903

[58] Field of Search .......... 29/739, 749-753, 29/857-867, 759, 760; 269/43, 217, 234, 254 CS, 903; 198/478, 479

[56] References Cited

U.S. PATENT DOCUMENTS

| | | | |
|---|---|---|---|
| 288,035 | 11/1883 | Dixon . | |
| 922,814 | 5/1909 | Reece | 269/217 X |
| 2,447,236 | 8/1948 | Dery . | |
| 2,893,275 | 7/1959 | Lindemann | 269/234 X |
| 2,902,059 | 9/1959 | Fiore et al. . | |
| 3,310,301 | 3/1967 | Netta et al. | 29/753 X |
| 3,374,525 | 3/1968 | Petry | 29/759 X |
| 3,583,055 | 6/1971 | Hammond | 29/753 X |
| 3,653,412 | 4/1972 | Gudmestad | 140/1 |
| 3,800,389 | 4/1974 | Brehm et al. | 29/753 X |
| 4,062,106 | 12/1977 | Hammond et al. | 29/759 X |
| 4,136,440 | 6/1979 | Brandewie et al. | 29/857 |
| 4,164,808 | 8/1979 | Gudmestad et al. | 29/564.4 |
| 4,175,316 | 11/1979 | Gudmestad | 29/564.4 |
| 4,196,510 | 4/1980 | Gudmestad et al. | 29/867 |
| 4,308,659 | 1/1982 | Brandewie et al. | 29/759 X |
| 4,372,041 | 2/1983 | Winkelman | 29/753 |
| 4,380,117 | 4/1983 | Brandewie et al. | 29/742 |
| 4,403,726 | 9/1983 | Snyder et al. | 269/234 X |

*Primary Examiner*—Howard N. Goldberg
*Assistant Examiner*—Joseph M. Gorski
*Attorney, Agent, or Firm*—Frederick W. Raring

[57] ABSTRACT

Harness making machine comprises an indexible conveyer having wire jigs thereon for holding wires in parallel relationship with the wire ends extending to one side of the conveyer. Each of the wire jigs comprises a plurality of individual wire clamps stacked against each other. The individual wire clamps can be moved from the stack to an extended position so that the wires are individually presented to wire processing machines, such as crimping machine, located on the one side of the conveyer. The invention encompasses the machine, the wire jig, and the method of making harnesses.

9 Claims, 13 Drawing Figures

2
14
130
6
114
118
126
135
115
8
92
30
6
7

HARNESS MAKING MACHINE HAVING IMPROVED WIRE JIG

FIELD OF THE INVENTION

This invention relates to harness making machines of the type comprising of conveyer having wire jigs thereon and crimping machines or the like at spaced-apart positions beside the conveyer. The invention is particularly directed to a harness making machine having an improved wire jig which permits selective presentation of the wires to the wire processing machines.

BACKGROUND OF INVENTION

U.S. Pat. Nos. 4,380,117 and 4,164,808 show commonly used types of harness making machines comprising a conveyer having wire jigs thereon for holding wires in side by side parallel relationship with the ends of the wires extending to one side or to both sides of the conveyer. Wire processing machines, such as an insulation stripping machine or crimping machines are located beside the conveyer so that the wire ends are presented to the processing machines during operation of the harness making apparatus. FIG. 8A of U.S. Pat. No. 4,380,117 shows one type of wire jig and another type of wire jig is shown in U.S. Pat. No. 4,372,041.

A characteristic of the wire jigs referred to above is that all of the wires in the jig are clamped relative to each other and the wires cannot be separately presented to the wire processing machines such as the crimpers. In other words, the wires must all be processed or treated in a given processing station when the harness making machine is operated. Harness making machines of the type disclosed in the above patents can therefore be used to install multi contact electrical connectors on the ends of the wires only if the connector is of the "mass termination" type; that is, if all of the wires are connected to the terminals in the connector in a single operation. Harness making machines of this type cannot be used if it is desired to crimp individual terminals onto the wires or to crimp terminals of different types onto the wire ends. For this reason, harness making machines as disclosed in U.S. Pat. Nos. 4,372,041 and 4,164,808 are of limited usefulness and are not capable of producing many of the types of electrical harnesses which are commonly used, such as a harness composed of a plurality of wires having many different types of terminals crimped onto the ends of the individual wires.

The present invention is directed to the achievement of the improved wire jig and to the achievement of an improved harness making machine which enables harnesses to be produced having different types of terminals attached to the ends of the wires. The invention is further directed to the achievement of an improved method of manufacturing electrical harnesses.

A wire jig in accordance with the invention is of the type used with a wire processing machine, the wire jig comprising a frame having a wire clamping assembly thereon for clamping a plurality of wires adjacent to the ends of the wires in side-by-side parallel relationship so that the ends of the wires can be presented to a wire processing apparatus. The wire jig is characterized in that the wire clamping assembly comprises a plurality of individual wire clamps, each wire clamp being capable of holding at least one wire adjacent to its end. The clamps are arranged in side-by-side relationship on the frame in a stack so that wires held in the clamps extend laterally from the stack. The clamps are normally in aligned positions with respect to each other in the stack and are individually slideable laterally from the stack to extended positions relative to the stack. Each individual wire clamp has a first actuator engaging portion which is engageable by a first actuator for sliding the individual clamp from its aligned position to its extended positions and returning the individual clamp to its aligned positions. Guiding surfaces are provided for guiding the individual clamps during sliding movement between their aligned positions and their extended positions whereby wires held in the individual clamps can be selectively presented to wire processing apparatus.

A further embodiment is characterized in that each wire clamp comprises first and second clamping members which are movable with respect to each other between a wire receiving position and a wire clamping position, each wire clamp being receptive to a wire when the first and second clamping members are in their wire receiving positions and being effective to clamp the wire when the first and second clamping members move relative to each other to the wire clamping position. A further embodiment is characterized in that at least one of the wire clamping members of each wire clamp has a second actuator engaging portion for engagement by a clamp opening actuator to move the first and second clamping members relative to each other. The first and second wire clamping members may comprise first and second clamping plates in parallel side-by-side relationship, the first and second clamping plates having opposed major surfaces which have contoured wire clamping positions which clamp a wire therebetween.

A harness making machine in accordance with the invention is of the type comprising a conveyer which is indexible in a first direction, a plurality of wire processing machines located at spaced-apart intervals on one side of the conveyer, and a plurality of wire jigs on the conveyer. Each of the wire jigs is capable of holding a plurality of wires in side-by-side parallel relationship with end portions of the wires extending to the one side of the conveyer so that the wires are presented to the processing machines as the conveyer is indexed. The harness making machine is characterized in that each of the wire jigs comprises a frame which is fixed to the conveyer and a wire clamping assembly on the frame. The wire clamping assembly comprises a plurality of individual wire clamps, each of which is capable of holding at least one wire, the wire clamps being normally disposed in normal positions in which the clamps are in aligned side-by-side relationship in a stack. The clamps are independently movable from the stack to an extended position, an individual clamp in its extended position being displaced laterally of the stack towards the one side of the conveyer. Clamp moving means are provided proximate to the processing machines for selectively moving individual clamps to their extended positions at the processing machines so that during continuous operation of the harness making machine, the wires in each wire jig are selectively presented to the wire processing machines.

In accordance with a further embodiment, the conveyer has a plurality of pairs of wire jigs thereon, the wire jigs of each pair being in aligned back-to-back relationship whereby both ends of the wires in the wire jigs are held. The harness making machine has a second plurality of wire processing machines located along the second side of the conveyer, the second side being the opposite side to the one side.

DRAWING FIGURES

THE PREFERRED EMBODIMENT

Figure 1:
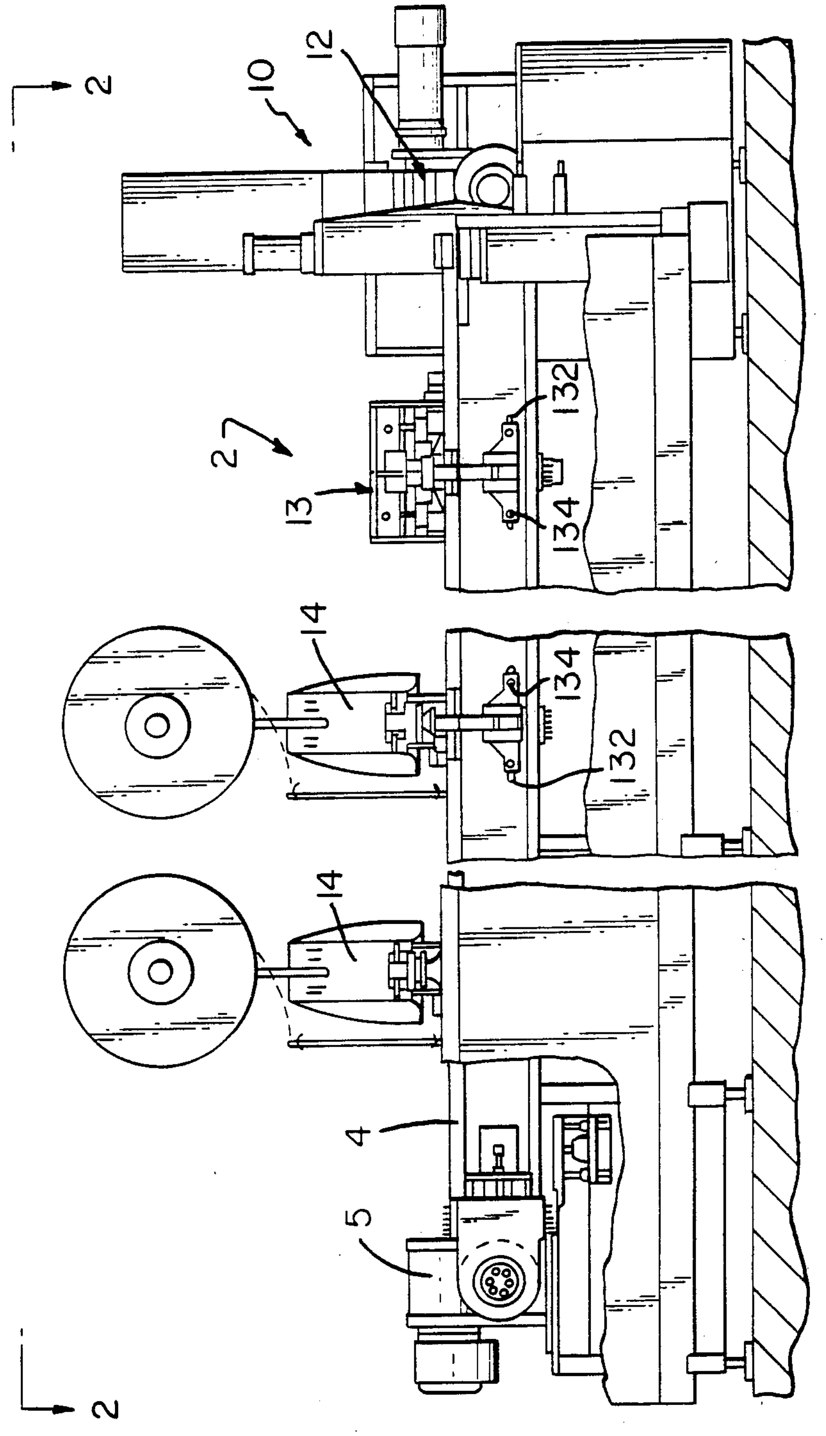
FIG. 1 is a frontal view of the harness making machine in accordance with the invention.
Figure 2:
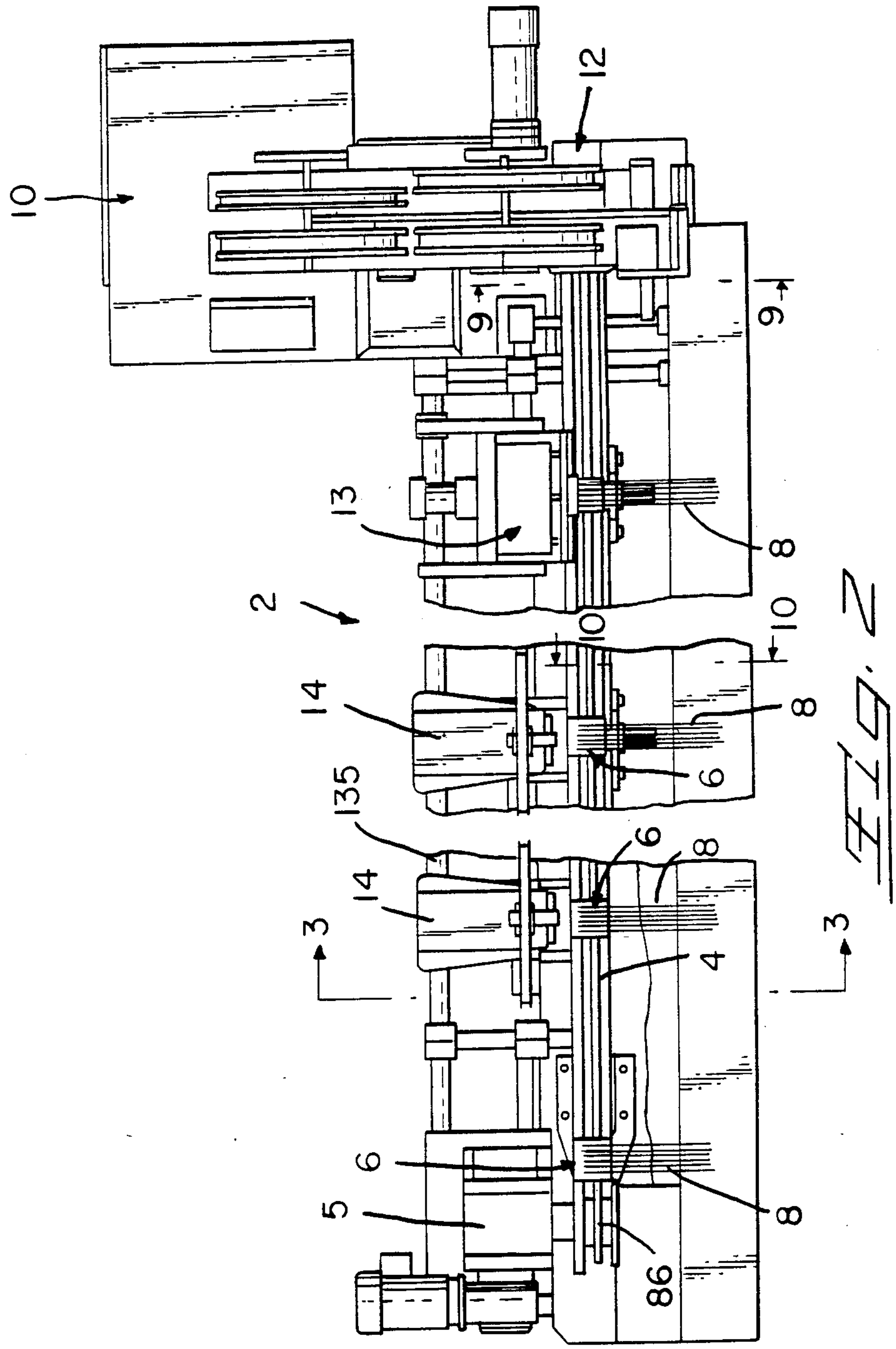
FIG. 2 is a top plan view of the machine of FIG. 1.
Figure 13:
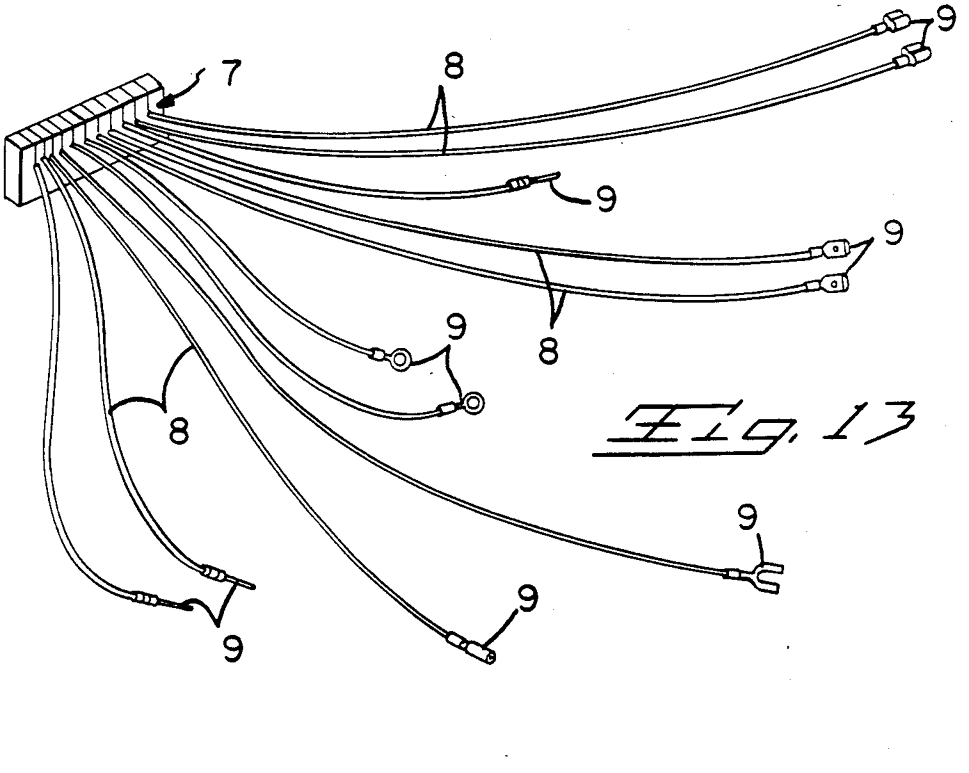
FIG. 13 is a perspective view of one type of harness.

FIGS. 1 and 2 show a harness making machine 2 comprising a conveyer 4 which is indexed by a motor and drive train 5 and which has a purality of wire jigs 6 thereon. Each of the wire jigs holds a plurality of wires 8 in side-by-side parallel relationship with the wire ends extending to one side of the conveyer. The wires are fed to the wire jigs at a loading station 10 and the embodiment shown also has an applicator 12 for installing a multi-contact electrical connector 7 on the harness at one end thereof, see FIG. 13. The wire feeder 10 may be of the type shown in U.S. Pat. No. 4,043,494 and have the capability of feeding varying lengths of wires as indicated by the harness of FIG. 13. The applicator 12 may similarly be of any desired type.

The ends of the wires which are held in the wire jigs 6 are moved first to a wire stripper 13 at which insulation is stripped and are then moved to a plurality of crimping machines 14 at which terminals 9 are crimped onto the ends of the wires. Different types of terminals can be crimped onto the wires at the several processing stations or crimping machines 14 as desired.

In the description which follows, an individual wire jig 6 will first be described in detail and the features of the harness making machine which are essential is an understanding of the invention will then be described.

As shown in FIGS. 4-8, each wire jig comprises a frame or support 16 having a wire clamping assembly 18 supported on its upper surface 20. The wire clamping assembly comprises a purality of individual wire clamps 22, each of which is capable of holding at least one wire with the wire end extending to the one side of the conveyer along which the processing machines 14 are located.

Figure 6:
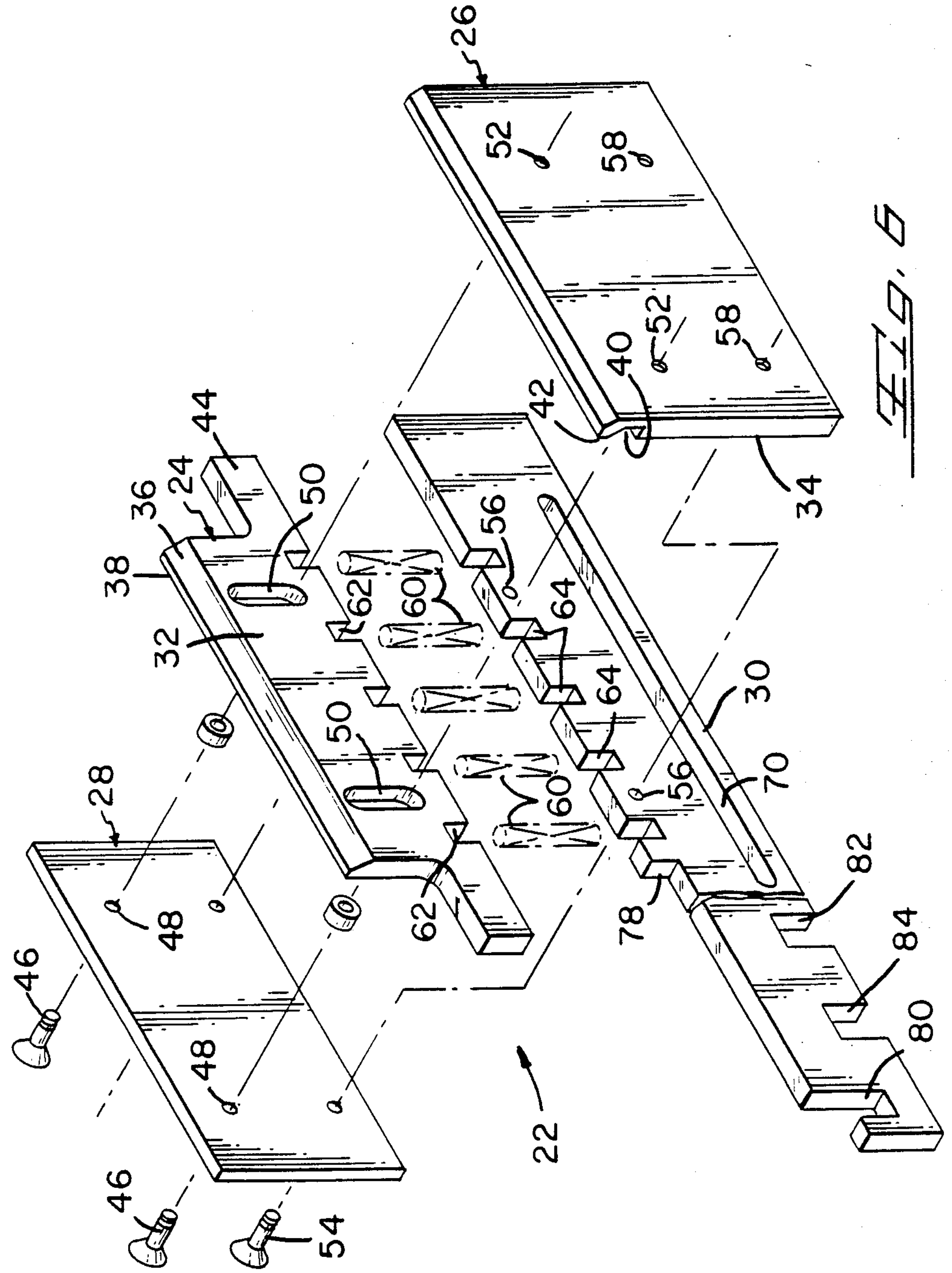
FIG. 6 is a perspective view of the clamp with the parts exploded from each other.
Figure 7:
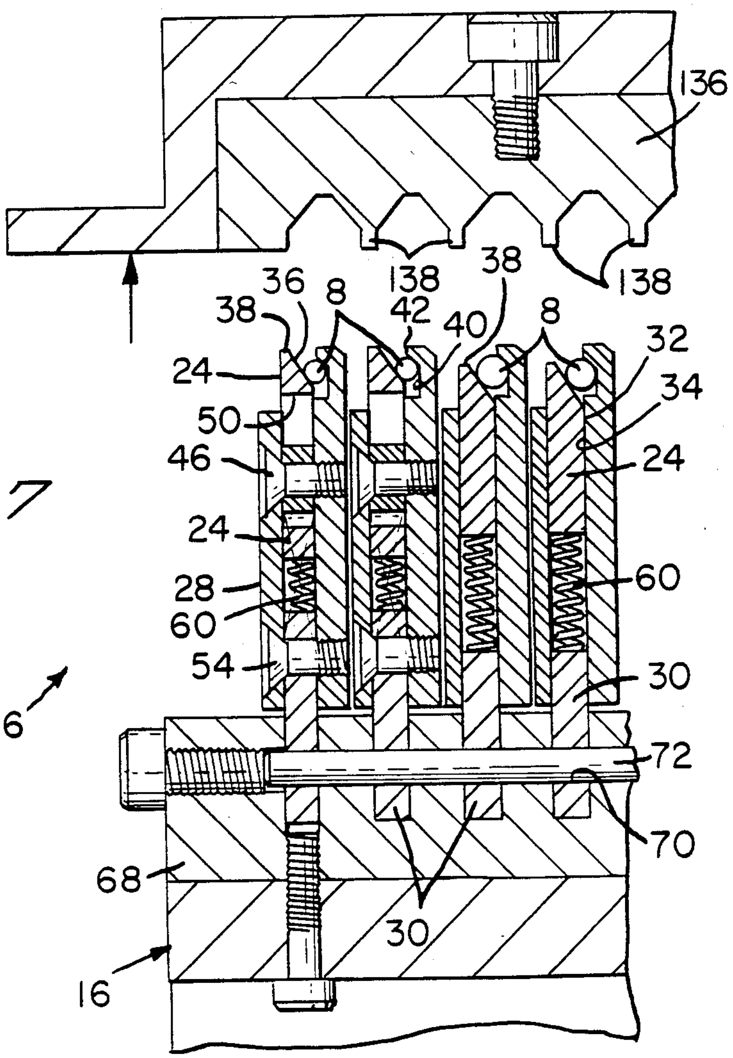
FIG. 7 is a cross section looking in the direction of the arrows 7—7 of FIG. 4 and showing also portions of a clamp opening member, this view showing the positions of the parts when wires are clamped in the individual clamps of the wire jigs.
Figure 8:
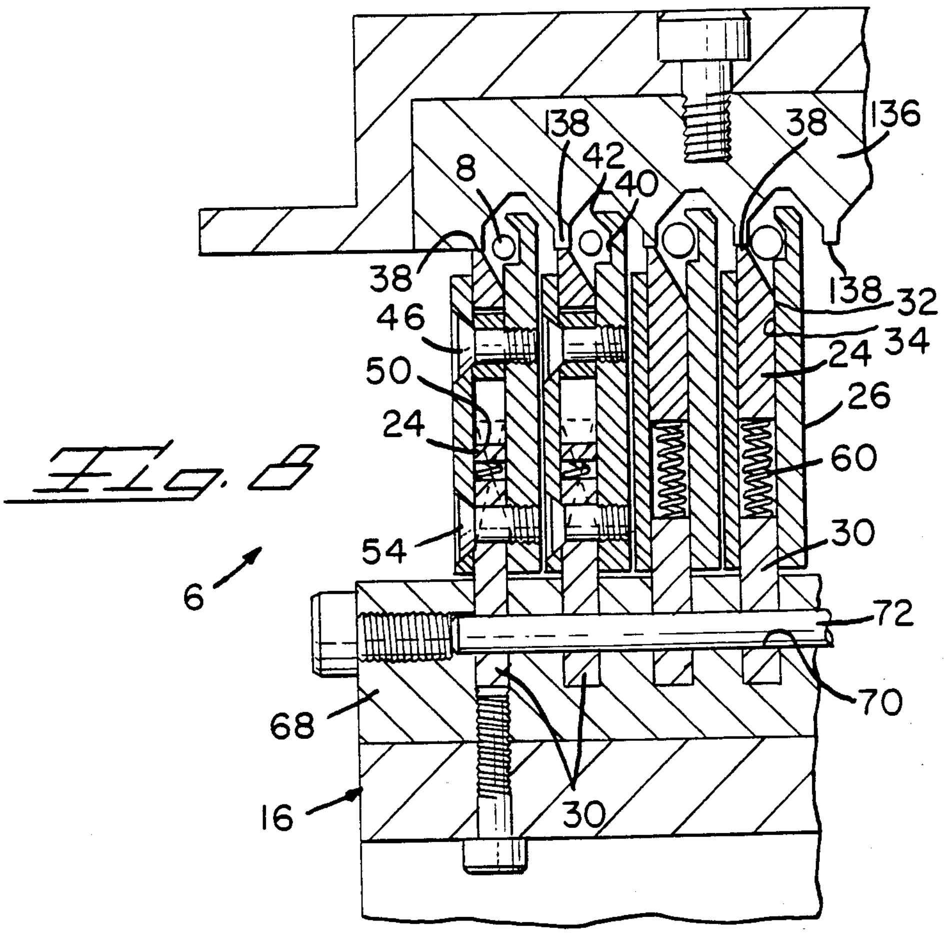
FIG. 8 is a view similar to FIG. 7 but showing the positions of the parts when the clamps are in their open positions.

Each individual wire clamp 22 comprises a first wire clamping plate 24, a second wire clamping plate 26, a retaining plate 28, and a slide member 30, see FIG. 6. The first and second wire clamping plates 24, 26, and opposed surfaces 32, 34 and the upper portion of the surface 32 is beveled as shown at 36 adjacent to the top side edge 38 of plate 24. The surface 34 of the second plate 26 has a groove or pocket 40 extending thereacross at its upper end and a ledge 42 extends over this groove. As shown in FIGS. 7 and 8, the beveled surface 36 and the pocket or groove 40 provide wire clamping surfaces which are capable of clamping wires of varying diameters.

The retaining plate 28 is secured to the slider 30 and to the second clamping plate 26 by means of screws 46, 54. The screws 46 extend through holes 48 in plate 28, through slots 50 in the first clamping plate 24, and are threaded into openings 52 in the second clamping plate 26. The screws 54 extend through holes in retainer plate 28, through holes 56 in the slide 30, and are threaded into openings 58 in the second clamping plate 26. The first clamping plate 24 is loosely held between the retainer plate and the second clamping plate and is captured by the screws 46 which permit vertical movement of plate 24 relative to the other parts of the clamp. Plate 24 is biased upwardly by springs 60 which are received in notches 62 in the lower edge of plate 24 and by notches 64 in the upper edge of the slider 30. As indicated by FIGS. 7 and 8, the first clamping plate 24 can be moved downwardly to the position FIG. 8 to permit placement of the wires in the wire clamp. The wires are thus clamped by the springs 60 which biase the plates 24 upwardly.

Figure 4:
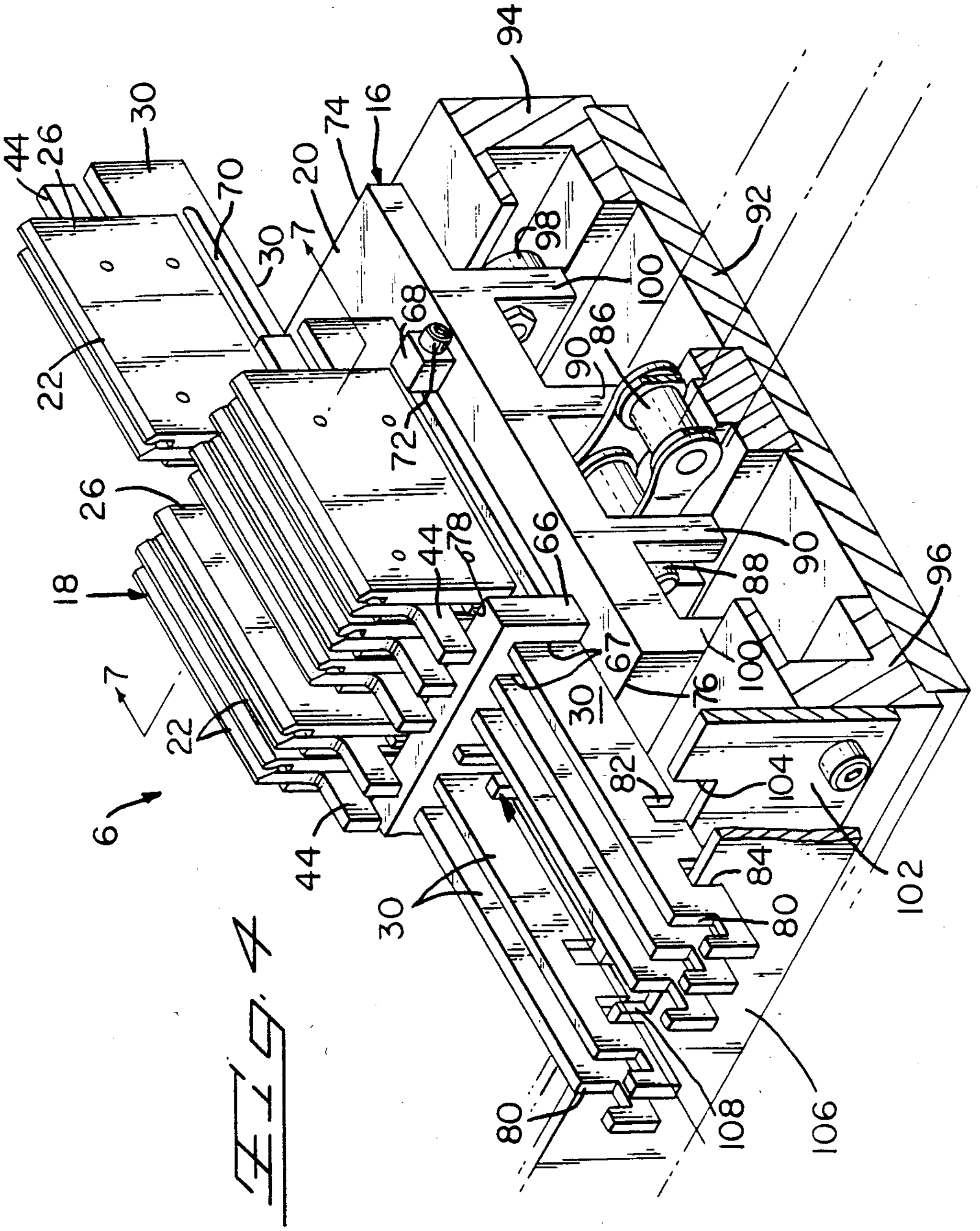
FIG. 4 is a perspective view of an individual wire jig of the type provided on the machine of FIGS. 1-3.
Figure 5:
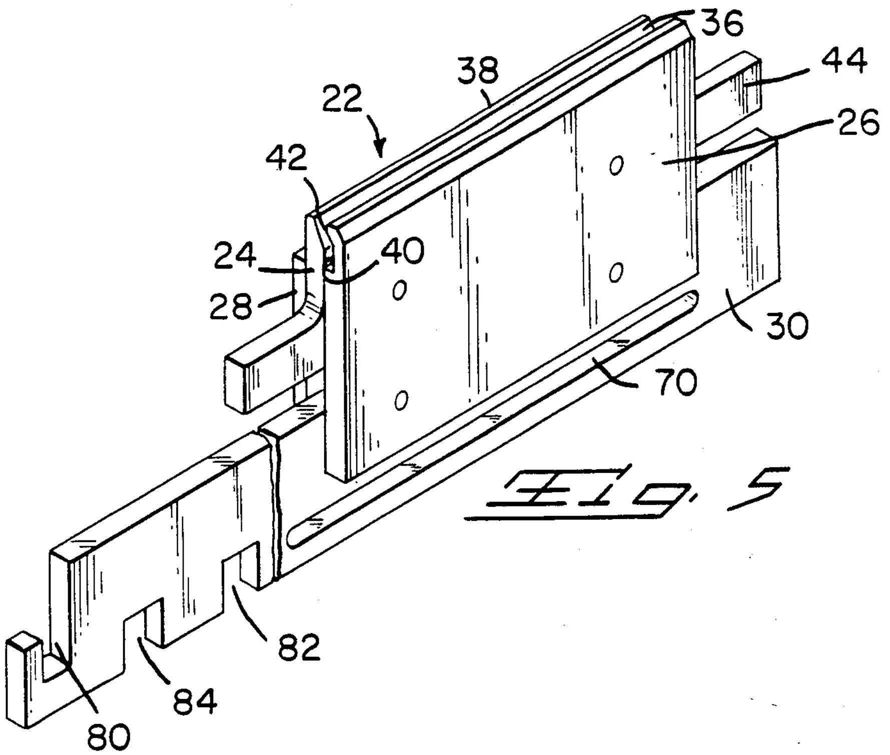
FIG. 5 is a perspective view of a wire clamp.
Figure 9:
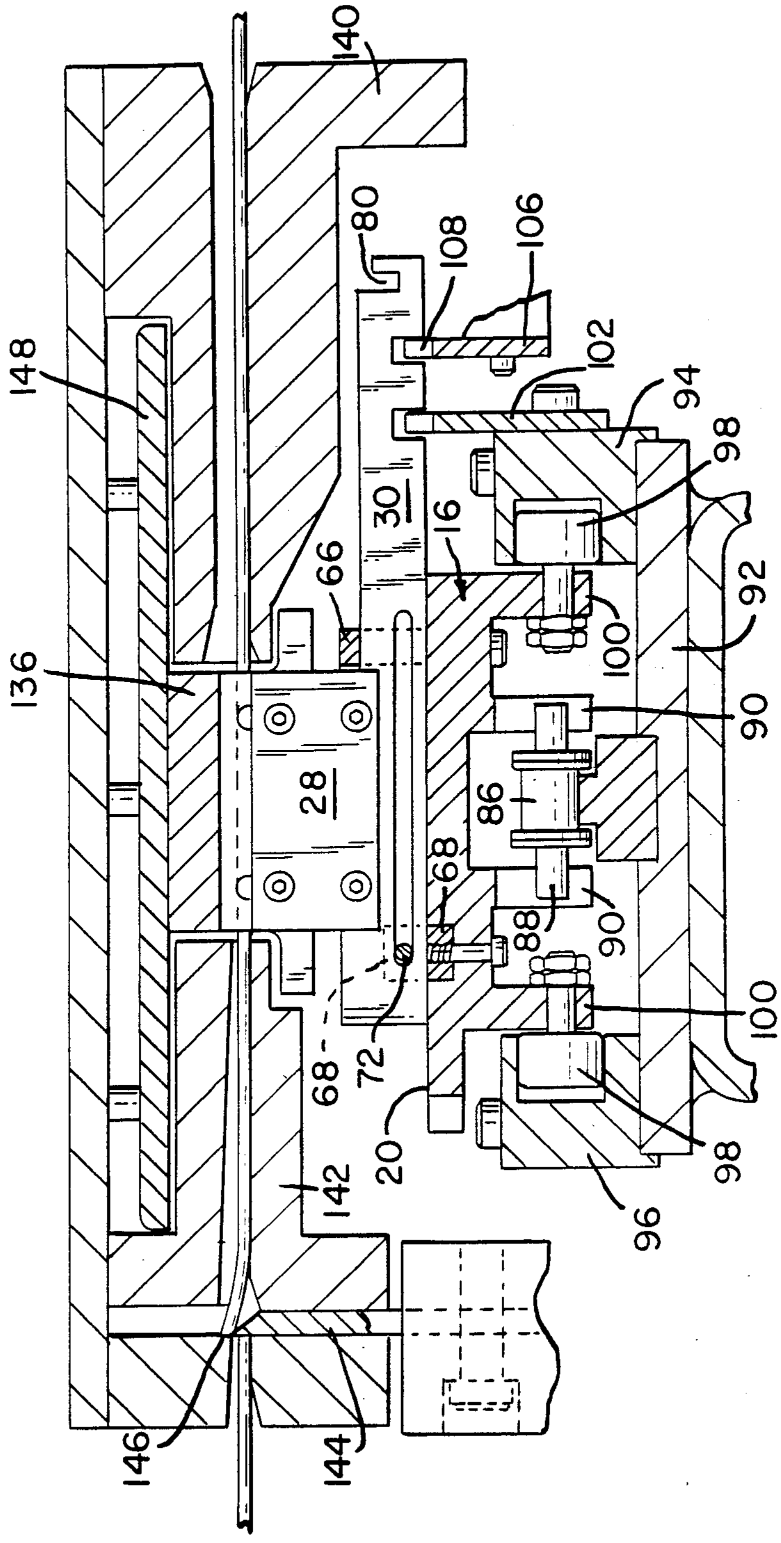
FIG. 9 is a view looking in the direction of the arrows 9—9 of FIG. 2 and showing the manner in which wires are fed to the wire jigs.

As shown in FIGS. 4 and 9, the individual wire clamps are maintained in a stack on surface 20 by retaining their guide members 66, 68 which are bolted to the upper surface 20 of the frame 16. The retainer 66 has spaced apart slots 67 therein which receive the slide members 30, a shoulder 78 being provided on each slide to limit leftward movement of the clamps beyond the positions shown on FIG. 4. The guide 68 is fitted in a recess in the frame, see FIG. 9, and has upstanding ears between which the forward portions of the slides 30 are received. Each slide 30 has an elongated slot 70 extending parallel to its lower edge and a rod 72 which is supported in the guide 68 extends through this slot. This slot 70 therefore limits rightward movement of the individual clamps when they are moved to their extended positions as will be described below.

Figure 10:
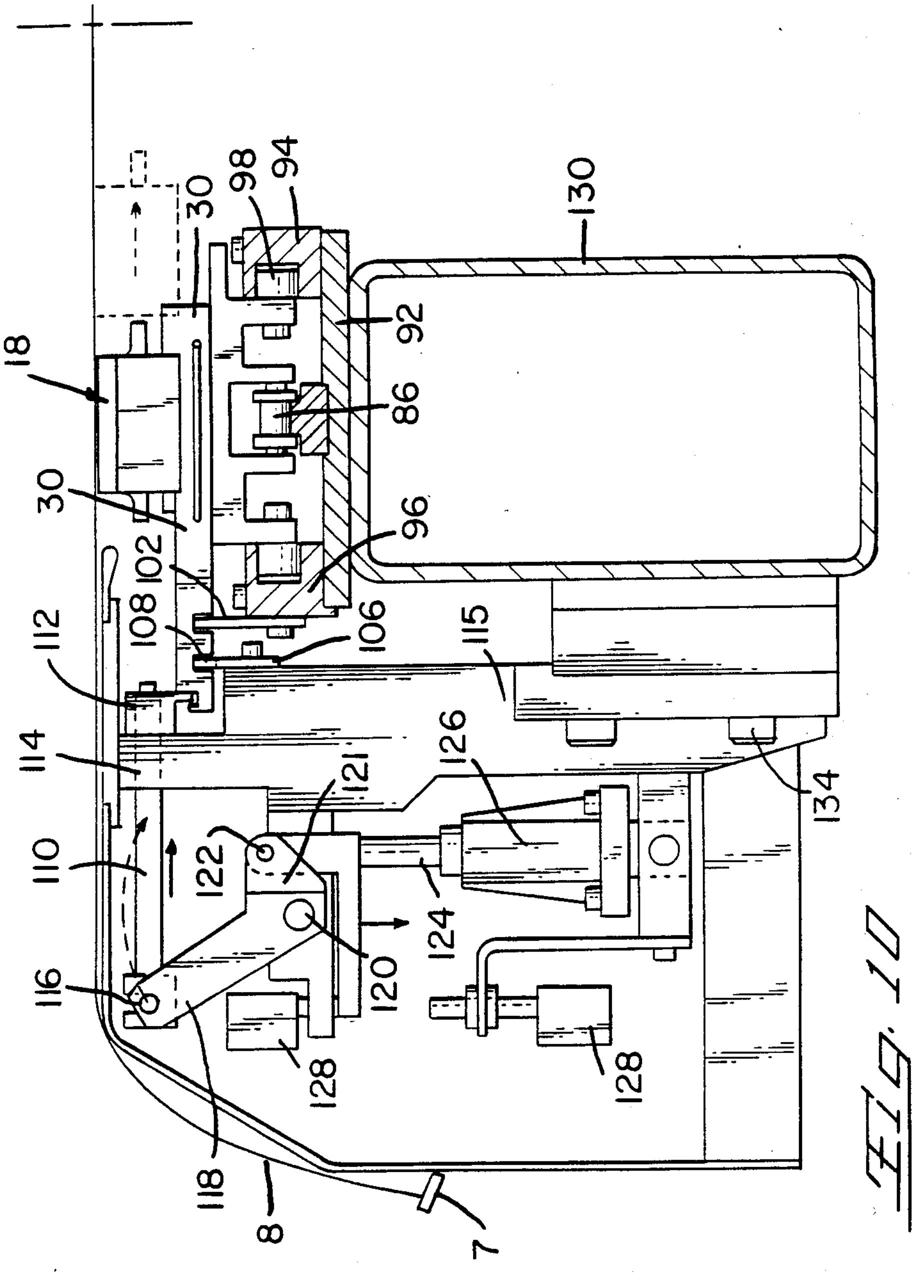
FIG. 10 is a view looking in the direction of the arrows 10—10 of FIG. 2 and showing a mechanism for moving an individual wire clamp to its extended position.

Each slide 30 has a notch 80 at its left-hand end as shown in FIG. 4 by means of which it is coupled by a clamp actuator shown in FIG. 10 and each slide has spaced apart notches 82, 84 in its lower edge which receives rails 102, 106 as shown in FIG. 9. The rail 102 extends along the entire conveyer path and maintain all of the wire clamps in a single stack when a wire jig is being moved between two adjacent processing machines 14. The rail 102 has an enlarged notch 104 at each of the processing machines so that all of the wire clamps 22 are free move to their extended positions.

Rails 106 are provided only at the processing machines 14 and are received in the notches 84 of the slides 30. The rails 106 are provided with a notch 108 which is in alignment with the slider 30 of the particular wire clamp which is to be moved to its extended position at a particular station. The rail 106 is thus programmed to prevent movement of those wire clamps which are to remain in the stack while one clamp is advanced as shown in FIG. 4. If desired, two or more clamps can be moved simultaneously at any one of the stations on the conveyer path.

The conveyer may be of any desired type and is shown and described only to the extent necessary for an understanding to present invention. The conveyer shown comprises a chain 86 having pins 88 which are received in slots in depending ears 90 on the underside of the frame 16. The chain 86 is supported on a rail which is centrally mounted on a support plate 92 which has opposed channel members 94, 96 on its side edges. Additional support for the frame 16 of the jig is provided by rollers 98 which are received in the channels and which are supported by ears 100 on the underside of frame 16.

Figure 3:
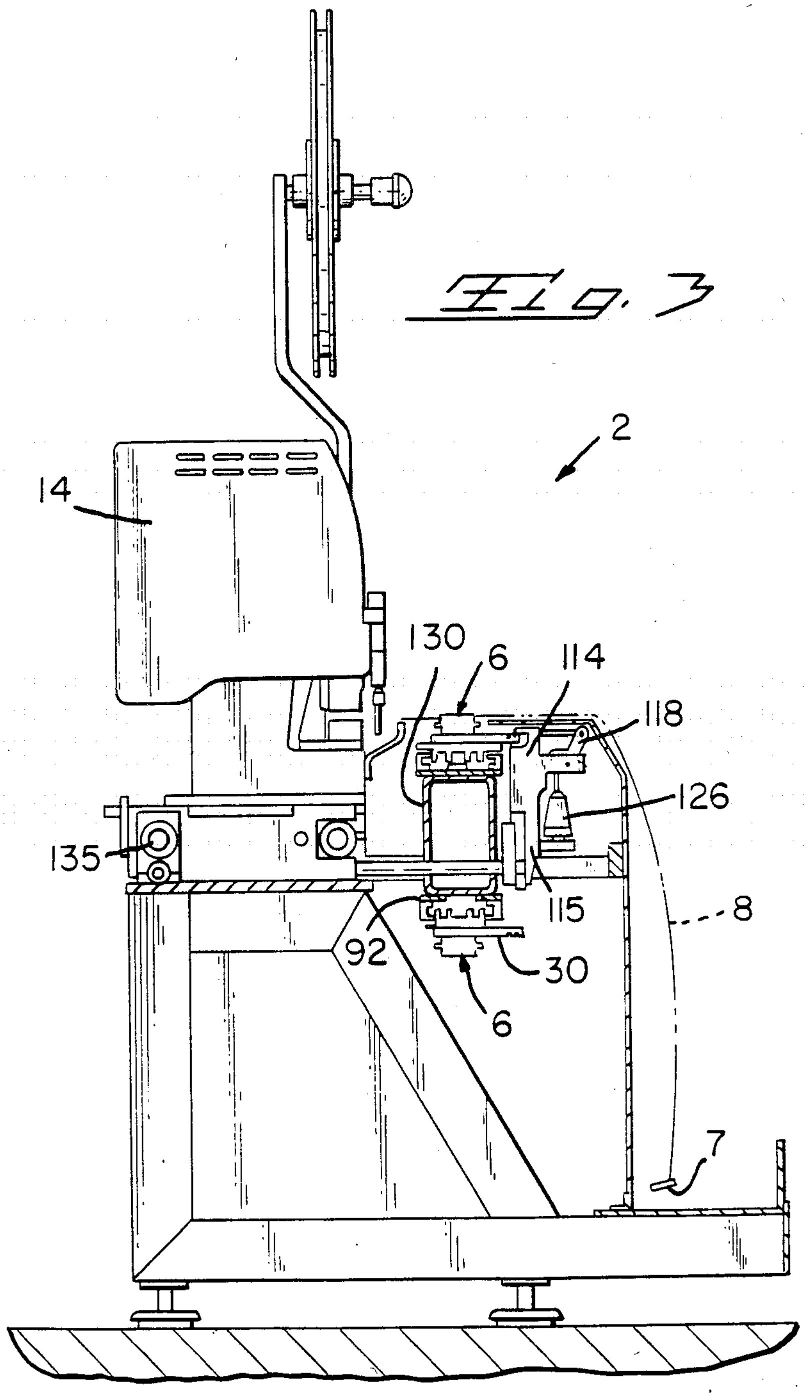
FIG. 3 is a view looking in the direction of the arrows 3—3 of FIG. 2.

Referring now to FIGS. 3 and 10, the actuator for moving an individual clamp to its extended position comprises an actuator rod 110 having a coupling 112 on its end which is received in the notch 80 of the appropriate slide member 30. The rod 110 is supported at 114 in a supporting frame 115 which in turn is secured to a tubular support 130 on which the plate 92 is supported. Rod 110 has a pin-slot coupling 116 to one arm 118 of a bell crank. The bell crank is pivoted at 120 and its other arm 121 is pivotally connected at 122 to a piston rod 124 which extends from a piston-cylinder 126. When the piston rod 124 is moved downwardly from the position shown in FIG. 10, actuator rod 110 is moved rightwardly and the wire clamp to which the rod is coupled is moved to its extended position. In this manner, the wire held in the clamp is selectively presented to a crimping machine or other wire processing machine 14. Limit switches as shown at 128 may be located adjacent to the moving parts to control the crimping press or otherwise control operation of the harness making machine.

Each of the actuators for advancing an individual wire clamp 22 is adjustably mounted on the machine by bolts 134 which extend through slots 132, see FIG. 1. The actuator can thus be moved by a slight distance so as to place it in alignment with the particular wire clamp 22 which is to be advanced. Additionally, the processing machines 14 can be adjustably mounted on rails 135 as shown in FIG. 2.

As mentioned previously, the wire feed 10 and the applicator 12 for installing the connector 7 on the wires can be any suitable type. FIGS. 7–9 show the manner in which the wires can be fed to the wire clamp and cut by a cutting means adjacent to the applicator 12.

To move the first clamping plates 24 downwardly, a depresser 136 is provided which has spaced apart projection 138 that engage the upper edges 38 of the first clamping plates 24 of each wire clamp. When this depresser 136 is in its lowered position, FIG. 8, a confined passageway is formed through which the wires can be fed. When the depresser 136 is moved upwardly to the position of FIG. 7, the first clamping plates 24 move upwardly and clamp the wires as shown in FIG. 7. The wires are guided by suitable guides 140, 142 and a cutting blade 144 is provided which cooperates with a cutting edge 146 to cut the wires at a location adjacent to the wire jig. In the embodiment shown, the depresser 136 is moved downwardly by a pressure plate 148.

The wire guides 140, 142 are capable of being opened or moved apart so that after cutting the wires, the conveyer can be indexed onto the wires moved laterally of their axes from the vicinity of the wire feed 10 and connector applicator 12 to the insulation stripper 13 and then to the processing machines 14.

Figure 11:
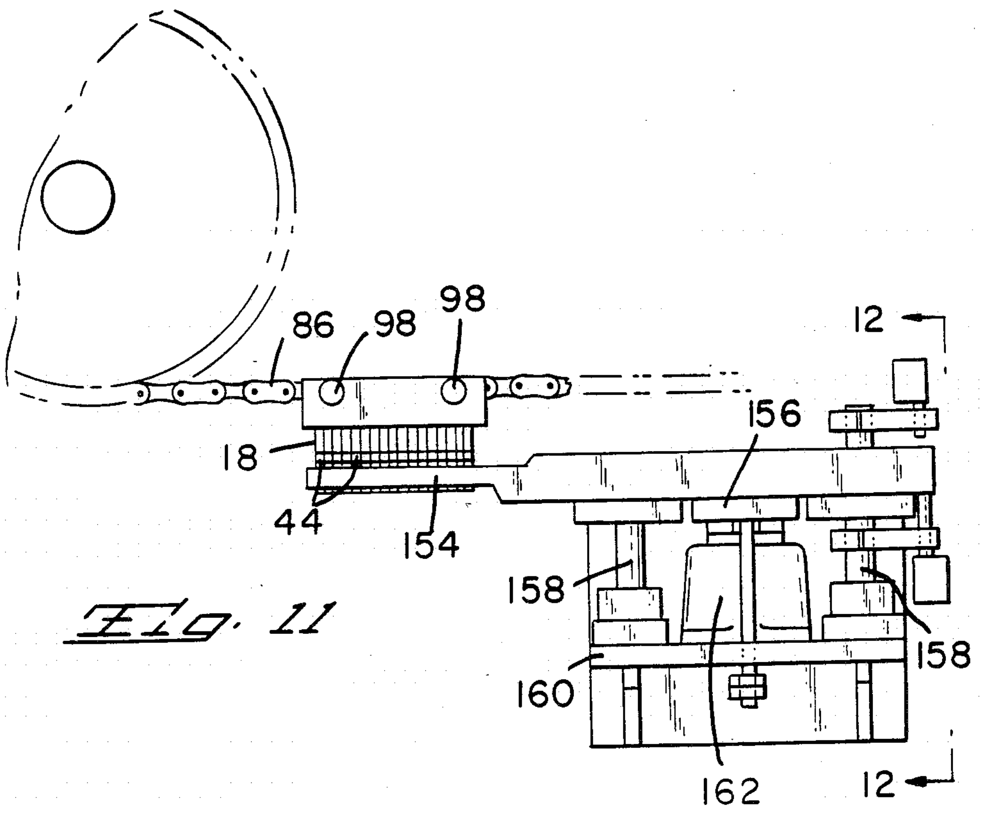
FIG. 11 is an enlarged side view of the unloading station of the machine at which wires held in a wire jig are released.
Figure 12:
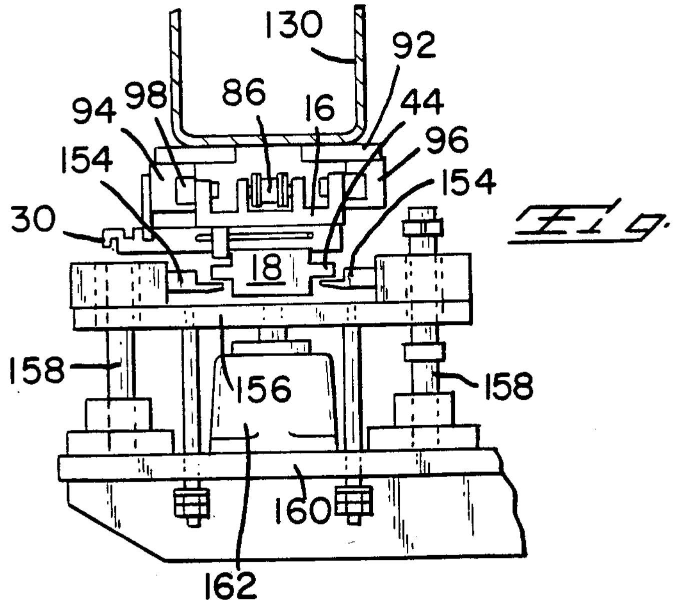
FIG. 12 is a view looking in the direction of the arrows 12—12 of FIG. 11.

FIGS. 11 and 12 show an unloading mechanism to open the wire clamps at an unloading station which is shown on the left in FIG. 1 adjacent to the conveyer drive 5. The unloading station is located on the underside or return side of the conveyer and comprises a pair of spaced apart cantilever members 154 which engage extentions 44 of the movable clamping plates 24. The bars 154 extend from a mounting plate 156 which is slideably supported on parallel rods or columns 158 that extend from a fixed support 160. The plate 156 can be moved upwardly a slight distance from the position shown in FIG. 13 so that the movable clamping plates are moved upwardly by cantilever members 154 and the wires released. The wires will then fall downwardly and be collected in a suitable bin.

The finished harness can alternatively be removed from the wire jigs by a robot device which would open the wire clamps and transport the harness to a suitable receiving location.

It will be apparent from the foregoing description that harness making machines in accordance with the invention are capable of producing a wide variety of types of harnesses by virtue of the fact that the wires held in each wire jig can be selectively presented to processing machines located beside the conveyer. The above identified U.S. Pat. No. 4,164,808 shows a machine which has associated pairs of wire jigs in back-to-back relationship so that both ends of every wire are held in jigs and can be presented to processing machines. Wire jigs of the type described above can be used with this type of harness making machine and the harnesses produced can have different types of terminals on each end of each wire in the harness. As also mentioned above, one or more multi contact connectors can be provided on one or both ends of the harnesses so that the harness will have two or more connectors on each end and several different types of terminals on the remaining wires.

We claim:

1. A harness making machine of the type comprising a conveyer which is indexible in a first direction, a plurality of wire processing machines located at spaced-apart intervals on one side of the conveyer, and a plurality of wire jigs on the conveyer, each of the wire jigs being capable of holding a plurality of wires in side by side parallel relationship with end portions of the wires extending to the one side of the conveyer so that the wires are presented to the processing machines as the conveyer is indexed, the harness making machine being characterized in that:

each of the wire jigs comprises a frame which is fixed to the conveyer and a wire clamping assembly on the frame, the wire clamping assembly comprising a plurality of individual wire clamps each of which is capable of holding at least one wire, the wire clamps being normally disposed in normal positions in which the clamps on each of the wire jigs are in aligned side by side relationship in a stack, the clamps on each of the wire jigs being independently movable from the stack to an extended position, an individual clamp in its extended position being displaced laterally of the stack towards the one side of the conveyer, and clamp moving means are provided proximate to the processing machines for selectively moving individual clamps to their extended positions at the processing machines, whereby, during continuous operation of the harness making machine, the wires in each wire jig are selectively presented to the wire processing machines.

2. A harness making machine as set forth in claim 1 characterized in that the conveyer has a plurality of pairs of wire jigs thereon, the wire jigs of each pair being in aligned back-to-back relationship whereby both ends of the wires in the wire jigs are held, the harness making machine having a second plurality of wire processing machines located along the second side of the conveyer, the second side being the opposite side to the one side.

3. A harnesses making machine as set forth in claim 2 characterized in that each of the wire clamps has a clamp slider thereon, the clamp moving means comprising a clamp mover at each of the wire processing machines, the clamp mover being engageable with a first actuator engaging portion which is on the clamp slider upon arrival of the wire jig at the processing machine.

4. A harness making machine as set forth in claim 3 characterized in that each wire clamp comprises first and second clamping members which are movable with respect to each other between a wire receiving position and a wire clamping position, each wire clamp being receptive to a wire when the first and second clamping members are in their wire receiving positions and being effective to clamp the wire when the first and second clamping members move relative to each other to the wire clamping position.

5. A harness making machine as set forth in claim 4 characterized in that at least one of the wire clamping members of each wire clamp has a second actuator engaging portion for engagement by a clamp opening actuator to move the first and second clamping members relative to each other.

6. A harness making machine as set forth in claim 5 characterized in that the first and second wire clamping members comprise first and second clamping plates in parallel side-by-side relationship, the first and second clamping plates have opposed major surfaces which have contoured wire clamping portions which clamp a wire therebetween.

7. A harness making machine as set forth in claim 6 characterized in that the first and second clampling plates are resiliently biased to the wire clamping position by spring means, the clamp opening actuator being effective to move the first and second clamping plates against the biasing force of the spring means.

8. A harness making machine as set forth in claim 7 characterized in that the contoured wire receiving portions define a wire-receiving pocket, the first wire clamping plate being biased to a normal position by the spring means, the first clamping plate being in the normal position when the first and second clamping plates are in the wire clamping position, the first clamping plate being movable towards the frame to a depressed position, the first clamping plate being in the depressed position when the first and second clamps are in the wire receiving positions.

9. A harness making machine as set forth in claim 1 characterized in that the frame of each wire jig comprises a frame plate, the individual wire clamps being slideably supported on the frame plate.

* * * * *